Sept. 25, 1962
L. W. PARMATER
3,056,084
ENGINE TACHOMETER
Filed Nov. 20, 1958
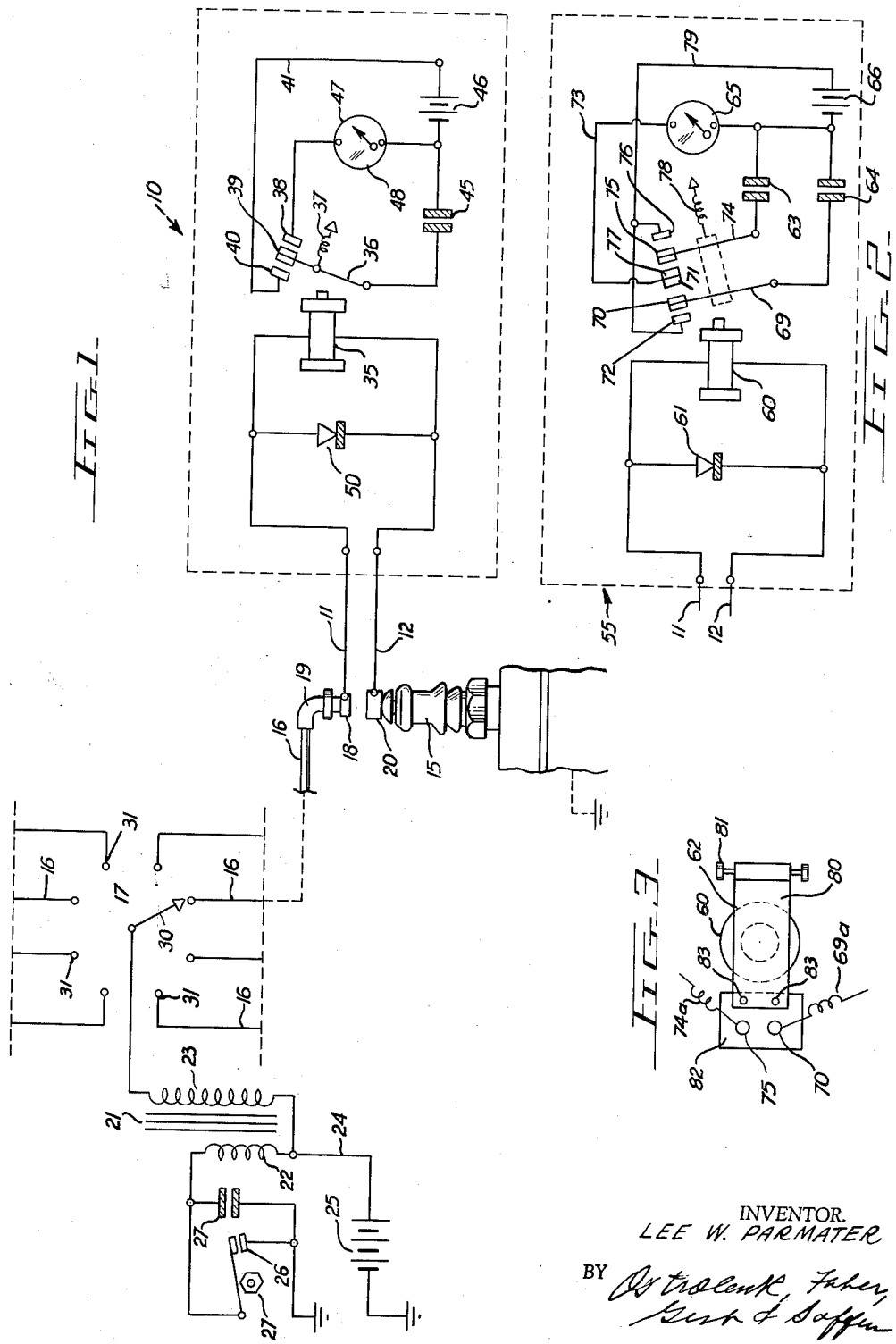
INVENTOR.
LEE W. PARMATER
BY
ATTORNEYS

United States Patent Office 3,056,084
Patented Sept. 25, 1962

3,056,084
ENGINE TACHOMETER
Lee W. Parmater, 10131 Riverview Drive,
Kalamazoo, Mich.
Filed Nov. 20, 1958, Ser. No. 775,271
2 Claims. (Cl. 324—70)

This invention relates to engine electrical tachometers, and more particularly to novel tachometers for measuring the speed of internal combustion engines.

While the invention tachometer is importantly useful in directly determining the speed of automotive type engines, it relies basically on intermittent electrical pulses of frequency proportional to the speed being measured. It thus is in effect useful to determine pulse frequencies as well. In practice the electrical input to the tachometer is through one of the spark plug leads from the distributor of the ignition system. Thus a high frequency high voltage pulse is applied for each revolution of the engine, and its r.p.m. established by suitable integration.

The tachometer hereof is of simple, relatively inexpensive arrangement, readily and directly usable. It comprises a relay energized by the ignition pulses, and a condenser charged when the relay is thus actuated. Upon relay deenergization the condenser is connected to discharge across an indicating ammeter, calibrated in the speed, r.p.m., (or frequency). Such relay-condenser-meter arrangement has been heretofore employed, but becomes inefficient and less sensitive for higher engine speeds. An important aspect of the present invention is to improve the reliabilty and sensitivity of the tachometer system, particularly at the higher frequency range, and to substantially extend the speed indication range thereof.

The spark pulse duration to each cylinder of a six or eight cylinder engine is less than one-sixth or one-eighth, respectively, of each revolution cycle. At 2400 r.p.m. each revolution occurs in 0.025 second. The spark pulse durations are thus less than 0.004 second for six cylinder engines, and less than 0.003 second for eight cylinder engines, at 2400 r.p.m. Such short pulse periods cause problems in relay response and therefore of the condenser charging action. The linearity of frequency-to-condenser discharge integration desired, has heretofore been impractical to achieve as the speed range of such tachometer was extended. Further, the relay action required become faulty as the pulse time became too small, at the higher speeds.

In accordance with the present invention I connect a rectifier, preferably a solid-state diode type, across the relay of the aforesaid tachometer arrangement. Upon cessation of the spark pulse applied to the relay, the current in the relay coil thereupon collapses. Upon the lagging current collapsing, a counter E.M.F. or voltage is produced across the rectifier, resulting in a continuing current feeding into the relay coil in the same direction. Such action in effect lengthens the output or pulse current action time on the relay, and thereupon on the tachometer system. The relay action is thus made more positive, and remains energized substantially longer, at the higher engine speeds, as compared to prior systems. The condenser charging time is correspondingly improved, and both linearity and sensitivity is increased, as is the reliability.

Further, in accordance with the present invention, two capacitors are arranged in a novel manner to be alternately charged and discharged in response to the relay actuations. As a result, the indication sensitivity is doubled for a given system. Also, troublesome ripples in indications at low speeds of prior tachometers are eliminated. The second condenser is connected to an independent contactor on the common relay in a manner to be set forth. In combination with the rectifier arrangement described hereinabove a tachometer is afforded that insures positive readings at both lower and higher speed levels than heretofore practical.

It is a primary object of the present invention to provide a novel pulsed electrical tachometer with positive indications at both low and high speeds.

It is another object of the present invention to provide a novel electrical tachometer operable from ignition spark pulses, that is rugged and fool-proof in operation over extended speed ranges.

A further object of the present invention is to provide a novel tachometer incorporating a relay with a rectifier to lengthen the effect of pulse actuations thereof.

Still another object of the present invention is to provide a novel tachometer incorporating charging condensers alternately charged and discharged under the control of a single relay.

Still a further object of the present invention is to provide a novel electrical tachometer for determining speeds of internal combustion engines through ignition spark pulses, of relatively high sensitivity and low cost.

These and further objects of the present invention will become more apparent in the following description of exemplary embodiments thereof, and illustrated in the drawing, in which:

FIGURE 1 is a schematic electrical diagram of one form of the invention tachometer in circuit with a typical automotive ignition system.

FIGURE 2 is a schematic electrical diagram of another form of the invention tachometer.

FIGURE 3 is a detail view of the relay armature used in the system of FIGURE 2.

The tachometer embodiment 10 shown in FIGURE 1 is connected in a conventional ignition system of an internal combustion engine. The input leads 11, 12 of tachometer 10 is inserted between a spark plug 15 and its cable 16 from the distributor 17. One form of connection is a plug 18 inserted in hooded end 19 of the spark plug wire 16, and a contact cap 20 on the tip of spark plug 15. The ignition system comprises step-up transformer 21 with primary winding 22 and secondary winding 23. One end of each winding 22, 23 is interconnected, and connected by lead 24 to the engine battery 25. The breaker contacts 26 are intermittently closed and opened by cam 27, usually driven by the distributor cam shaft, at a rate proportional to the engine speed.

The primary condenser 27 is shunted across contacts 26, with one end grounded to complete the primary circuit through battery 25. Condenser 27 and primary coil 22 produce a series of high frequency currents upon opening of contacts 26, as is known in the art. The high step-up ignition transformer produces the high voltage output that is distributed to the spark plugs (15) through distributor 17. Rotary contactor 30 of distributor 17 successively connects with contacts 31, 31 and to the spark plugs through individual distributor cables 16, 16. The illustrated distributor 17 has eight contacts 31, 31 for the eight spark plugs of the eight cylinder engine (not shown). The connected secondary coil 23, through distributor 17, causes firing of the spark plugs in the conventional manner.

Only one distributor wire connection (16) to one spark plug (15) is tapped for the tachometer 10 input leads 11, 12; with the tachometer input circuit completing the high tension current circuit through to the spark plug 15, and ground, as shown in FIGURE 1. The ignition spark pulse from secondary 23 is impressed on input leads 11, 12 for a duration of less than one-eighth of each engine revolution, in this embodiment. As hereinabove set forth, the pulse signal thereby imparted on tachometer system 10 is less than 0.003 second for 2400 r.p.m., and diminishes as the speed is increased.

The tachometer 10 comprises an electromagnetic relay 35 connected between input leads 11, 12, to receive the spark pulses. The armature 36 of relay 35 is normally biased against its back-contact 38 through spring 37. When relay coil 35 is energized by an ignition pulse signal as aforesaid, it attracts armature 36 against forward contact 40. Central contact 39 of armature 36 is thus actuated between contacts 38 and 40 at a frequency equal to that of the impressed spark pulses from the ignition system, as will now be understood.

A condenser 45 is utilized to receive successive charges from a local battery 46 in consonance with the relay actuations, and intermittently discharge through an ammeter 47. The current measuring meter 47 thereby provides a direct indication of the speed of the engine, or frequency of the spark pulse input, on its scale 48. Towards this end, condenser 45 is connected directly across meter 47 when armature 36 and contact 39 are against back-contact 38, as shown in FIGURE 1. Upon pulse energization of relay coil 35, armature 36 with its contact 39 are moved against forward contact 40 to disconnect condenser 45 from meter 47 and connect the condenser across the local battery 46 through lead 41. The condenser 45 is thereby charged for sequential discharge across meter 47.

An important feature of the present invention is the provision of a rectifier 50 connected in shunt across the relay coil 35. Rectifier 50 is preferably a solid state diode, such as of the selenium, germanium or silicon type. It is thus instantly ready for operation, and requires no standby energization. The chief function of rectifier 50 is to effectively lengthen the ignition pulse action in the system. As the engine speed increases, the spark pulse duration impressed on leads 11, 12 during each engine revolution correspondingly decreases. For a given relay, a point would be reached where the inherent relay actuation lag would be of the order of the input pulse duration, and the tachometer system would be inoperative in such speed range and above.

The rectifier 50 being connected across relay coil 35 has directly impressed upon it the counter E.M.F. generated by relay coil 35 as the current in it collapses upon cessation of the input pulse. The counter voltage across diode 50 is directly rectified to produce a current flow through relay coil 35 in the same direction as the collapsing current. This action uninterruptedly extends the effective current through the relay coil 35 for an appreciable amount over the original input pulse duration. The result is to produce positive and effective actuation of the relay armature 36 for engine speeds substantially higher than possible heretofore. For example, for a given relay structure in a tachometer system as per 10, the effective speed range is practically doubled by the use of a rectifier 50. Conversely, for a given speed range, a cheaper relay construction is usable with the rectifier arrangement, as compared to the prior art systems. Further, the sensitivity and reliability of the tachometer in the upper speed indications is more positive and steady.

FIGURE 2 is a schematic diagram of a further tachometer arrangement 55 that improves the steadiness of the lower speed range indications, and substantially increases the overall sensitivity of indications. The input leads 11, 12 connect directly across relay coil 60, with diode rectifier 61 in parallel therewith. Relay 60 comprises an armature 62 with two sets of contacts. One armature set controls the charge and discharge of a first condenser 63; and the other armature set, a second condenser 64. A single discharge current integrating ammeter 65 is in circuit therewith, and a single local battery 66.

Armature 62, indicated schematically in FIGURE 2, comprises two independent central contactors 70 and 75. Contactor 70 connects to condenser 64 through armature section 69; contactor 75, to condenser 63 through armature section 74. A biasing spring 78 normally holds both central contacts 70, 75 against their respective back contacts 71, 76. A spark pulse signal actuates contactors 70, 75 of double armature 69, 74 against their front contacts 72, 77. Contacts 72 and 76 are interconnected, and connect to battery 66 through lead 73. Contacts 71 and 77 are interconnected, and connect to meter 65 through lead 73.

The respective condensers 63, 64 are successively charged by battery 66 and discharged across meter 65 in consonance with the frequency of distributor pulse inputs to leads 11, 12. Upon a pulse signal applied to relay 60, armature 69, 74 is actuated to connect charged condenser 63 across meter 65, and already discharged condenser 64 across battery 66. Upon pulse cessation, relay armature 69, 74 is biased to the reverse or back contact position by spring 78. Thereupon the now charged condenser 64 is connected to discharge into meter 65, and the now discharged condenser 63, connected to charge across battery 66.

It is to be noted that for each pulse signal, two condenser charge and discharge cycles occur, which in effect not only doubles the effective current input to meter 65 for given battery (66) and condenser sizes, but more importantly doubles the frequency of the meter 65 input. Thus the meter 65 indications at the low speed range are made steadier, and more positive. Further, in view of the greater current integrated by meter 65, a less sensitive meter structure is usable for a requisite sensitivity of indication.

FIGURE 3 diagrammatically illustrates one form which the dual contactor relay 62 may assume. A soft steel armature 80 is pivoted on rod 81, and actuated by relay coil 60. The biasing spring (78) is not shown, but readily understood. An insulation panel 82 is riveted at 83, 83 to edge of armature 80. The central contactors 70, 75 are set into panel 82, and coact with their respective front and back contacts (not shown). Pigtail leads 69a and 74a extend from contactors 70, 75 for circuital connection. Relay 60, 62 may, of course, take other practical forms to accomplish its operational functions as described in connection with FIGURE 2 hereinabove.

The tachometer system 55 thus has increased sensitivity due to the successive discharging of two condensers (63, 64) for each rotation cycle, and increased indication stability due to the twice-frequency afforded by the dual condenser (63, 64) use. Further, system 55 operates effectively and positively at a substantially higher top speed limit due to the pulse lengthening action of diode rectifier (61) across the relay coil (60). The tachometer 55, therefore, provides a wider speed operative range from low to high, with simple relatively inexpensive construction, than comparable systems of prior constructions.

Although the present invention has been set forth in connection with specific embodiments thereof, it is to be understood that modifications and variations may be made therein within the broader spirit and scope of the invention, as defined in the following claims.

I claim:
1. An electrical tachometer for internal combustion engines of the character described, comprising a relay responsive to relatively short electrical pulses from the engine ignition system corresponding to the speed rate to be measured, contact means actuated by said relay upon pulse flow therethrough, a condenser in circuit with said contact means and arranged to be successively electrically charged and discharged in correspondence with the pulse actuations, a meter in circuit with said contact means and said condenser for integrating the condenser discharges and indicate the engine speed, and a rectifier in shunt with said relay for extending the effective relay actuation substantially beyond the short pulse durations to provide greater periods of contact means actuation and thereby establish positive operation of the tachometer at the higher engine speeds.

2. An electrical tachometer as claimed in claim 1, further including a second condenser in circuit with said contact means and arranged to be charged and discharged in alternation with that of the first said condenser, said contact means containing a movable contactor individual to each of said condensers and movable in unison by the relay, and contacts coactable with the contactors and in circuit with the meter to effect the alternate condenser charging and their successive discharging through said meter and provide effective low speed indications.

References Cited in the file of this patent

UNITED STATES PATENTS

| | | |
|---|---|---|
| 2,473,542 | Philpott | June 21, 1949 |
| 2,617,083 | Petroff | Nov. 4, 1952 |
| 2,724,088 | Smith | Nov. 15, 1955 |
| 2,824,265 | Seeger | Feb. 18, 1958 |

FOREIGN PATENTS

| | | |
|---|---|---|
| 465,250 | Great Britain | May 4, 1937 |

OTHER REFERENCES

Relay Engineering (Packard), published by Struthers-Dunn, Inc. (Philadelphia, Pa.), pp. 484–485.